United States Patent [19]

Miyazaki et al.

[11] Patent Number: 4,610,503

[45] Date of Patent: Sep. 9, 1986

[54] PROTECTIVE DEVICE FOR OVERHEAD WIRES CONTAINING OPTICAL FIBER UNITS

[75] Inventors: Hideaki Miyazaki; Yoshikazu Yamano, both of Osaka; Yasunori Saito, Yokohama; Mikihiko Okano; Tsuneo Nakano, both of Osaka, all of Japan

[73] Assignee: Sumitomo Electric Industries, Ltd., Japan

[21] Appl. No.: 642,526

[22] Filed: Aug. 20, 1984

[30] Foreign Application Priority Data

Aug. 31, 1983 [JP] Japan .................................. 58-161543

[51] Int. Cl.⁴ .................................................. G02B 6/36
[52] U.S. Cl. .................................. 350/96.20; 174/70 R
[58] Field of Search .............. 350/96.20, 96.21, 96.22, 350/96.23; 174/70 R

[56] References Cited

FOREIGN PATENT DOCUMENTS

| 2534700 | 4/1984 | France ............................ 350/96.23 |
| 0158609 | 9/1983 | Japan ............................. 350/96.23 |
| 0163905 | 9/1983 | Japan ............................. 350/96.23 |
| 2119956 | 11/1983 | United Kingdom ............. 350/96.23 |

*Primary Examiner*—William L. Sikes
*Assistant Examiner*—Lester Rushin
*Attorney, Agent, or Firm*—Ernest A. Beutler

[57] ABSTRACT

Structure for connecting overhead earth wires with an optical fiber unit is proposed which comprises a protecting member for protecting the optical fiber unit from deformation. The protecting member is formed with a through hole for passing the optical fiber unit and with longitudinal grooves to receive the conductors.

3 Claims, 8 Drawing Figures

PROTECTIVE DEVICE FOR OVERHEAD WIRES CONTAINING OPTICAL FIBER UNITS

The present invention relates to improved structure for connecting overhead earth wires containing an optical fiber unit, and more particularly to the structure for connecting them in a dead end clamp or a mid span joint.

Figure 4:
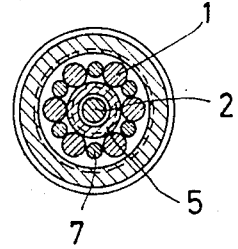

In case of a conventional structure, a wedge-shaped protecting member 5 is inserted between the conductors 1 and the optical fiber unit 2 in order to protect the unit from deformation when compressed. The protecting member 5 is provided at one end thereof with a ring 6 having holes into which pins 7 are inserted at regular intervals between the conductors 1 as shown in FIG. 4 so as to prevent the conductors from shifting at one side. At and near the portion where the pins 7 are inserted, they serve to separate the conductors 1 evenly from one another but do not at a position far away from the portion. In addition, the compression strength is not sufficent in the proximity of the end of the protecting member 5, because the shifting of the conductors 1 is liable to occur in this area. In order to eliminate this drawback, the area compressed has been enlarged with the use of an elongated member 5, so that required connecting strength will be obtained. The situation was the same in case the wires are connected in a mid span joint instead of a dead end clamp.

As mentioned above, in the conventional structure for connecting the overhead earth wires, work efficiency was unsatisfactory because of use of a long protecting member and necessity of inserting the pins between the conductors.

An object of the present invention is to provide an improved structure for connecting overhead earth wires containing an optical fiber unit which obviates the abovesaid shortcomings.

In accordance with the present invention, a protecting member is used which is formed with a through hole for passing an optical fiber unit therethrough and on its outer surface with a plurality of longitudinal grooves to receive the conductors therein.

Figure 1:
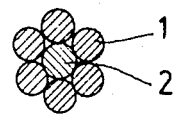
FIG. 1 shows an example of overhead earth wires containing an optical fiber unit. An optical fiber unit 2 is disposed in the center of a bundle of six conductors 1, each of which consists of e.g. an aluminum or aluminum alloy wire.
Figure 2:
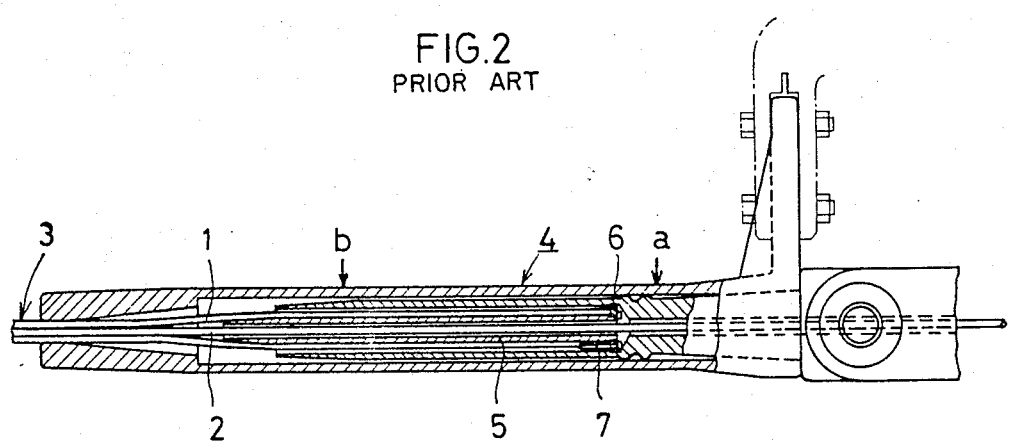
FIG. 2 shows the above-described overhead earth wire 3 inserted in a dead end clamp 4, which is compressed at the portions indicated by arrows a and b for mechanical and electrical connections.
Figure 3:
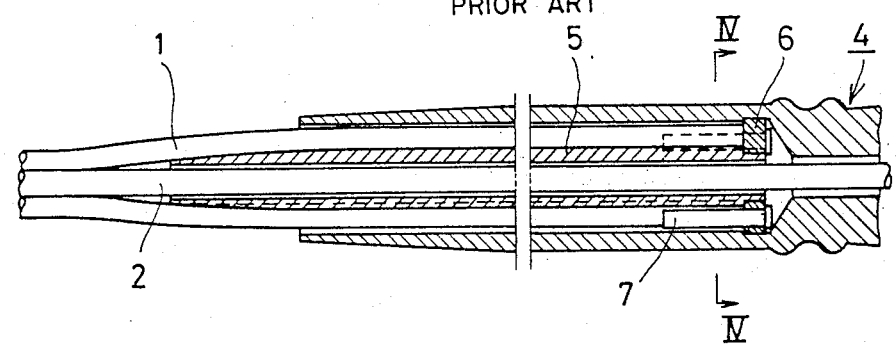
Figure 5:
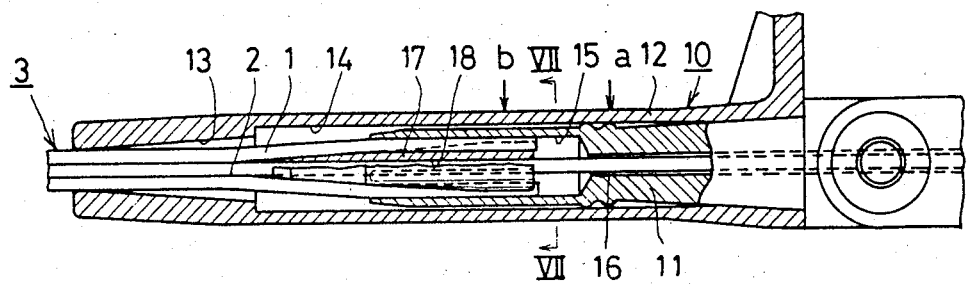
Figure 6:
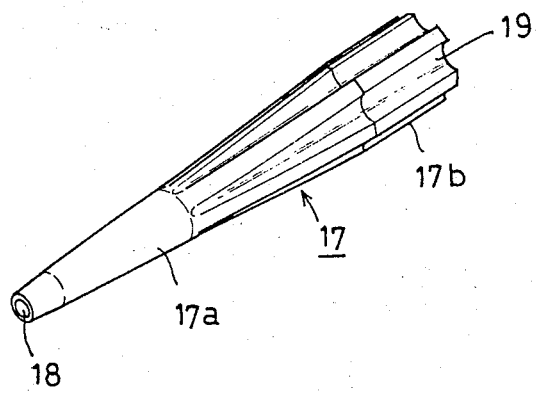
Figure 7:
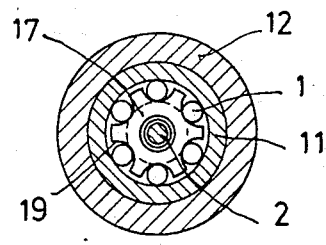

Other objects and features of the present invention will become apparent from the following description taken with reference to the accompanying drawings, in which:

FIG. 1 is a sectional view of an example of an overhead earth wire containing an optical fiber unit;

FIG. 2 is a longitudinal section of a conventional structure;

FIG. 3 is an enlarged longitudinal section of a portion thereof;

FIG. 4 is a sectional view taken along line IV—IV of FIG. 3;

FIG. 5 is a longitudinal section of a structure embodying the present invention;

FIG. 6 is a perspective view of the protecting member used in the embodiment;

FIG. 7 is an enlarged sectional view taken along line VII—VII of FIG. 5; and

Figure 8:
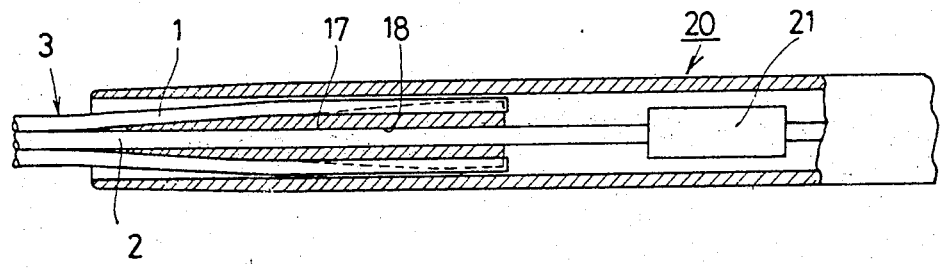

FIG. 8 is a longitudinal section of the structure using a mid span joint.

FIGS. 5 to 7 show a preferred embodiment of the present invention in which a dead end clamp is used. The dead end clamp 10 comprises a male member 11 in combination with a female member 12. The female member 12 is provided with a hole 13 in one end thereof through which the overhead earth wire 3 is drawn thereinto, and with a hole 14 in the other end to receive the male member 11. The male member is provided with a hole 15 in one end thereof to receive the overhead earth wire 3, and with a through hole 16 which communicates with the hole 15.

A protecting member 17 is inserted into the hole 15 of the male member 11. The optical fiber unit 2 is inserted into a through hole 18 provided in the protecting member 17, passed through the hole 16 of the male member 11, and drawn out of the dead end clamp.

As shown in FIG. 6, the protecting member 17 has a tapered portion 17a and a cylindrical portion 17b continuing from the thick end of the tapered portion, and is formed with longitudinal grooves 19 to receive the conductors 1 at regular intervals. These grooves extend from the middle of the tapered portion 17a to the opposite end of the cylindrical portion 17b. The depth of each groove 19 is slightly smaller than the diameter of each conductor 1.

The protecting member 17 is inserted into the hole 15 of the male member 11 so that its grooved portion is housed in the hole 15. The conductors 1 are inserted from the end of the tapered portion 17a of the protecting member 17 so as to be evenly distributed by the grooves 19.

When the parts have been assembled in the above-described manner, i.e., into a condition shown in FIG. 5, compression is applied to the portions indicated by arrows a and b so as to bring the male member 11, female member 12 and conductors 1 into close contact with each other. Because of the provision of the protecting member 17, the optical fiber unit 2 is not affected when compressed.

FIG. 8 shows another embodiment in which the connection is performed in a mid span joint 20. The same protecting member 17 as the above-described one are inserted into both ends of the sleeve 20. Then the sleeve is compressed to ensure mechanical and electrical connections. The numeral 21 refers to a connector of the optical fiber units 2.

It will be understood from the foregoing that since the protecting member is formed with equally spaced grooves, it can keep the conductors at equal spacings. Because the conductors cannot shift at one side, the connecting strength by compression of the dead end clamp (or mid span joint) against the conductors will be higher than before. The protecting member do not have to be so long as before.

What are claimed are:

1. Structure for connecting overhead earth wires containing an optical fiber unit, said optical fiber unit being disposed in the center of a bundle of conductors, said structure comprising connector means for connecting said overhead earth wires therein and for compression against said conductors for mechanical and electrical connections, and protecting means for protecting said optical fiber unit from being deformed when said connector means is compressed, said protecting member having a tapered portion merging into a straight portion and being formed with a through hole to pass said optical fiber unit therethrough and a plurality of longitudinal grooves extending from the middle of said tapered portion and through the complete length of said straight portion for receiving said conductors therein.

2. The structure as claimed in claim 1, wherein said connecting means is a dead end clamp.

3. The structure as claimed in claim 1, wherein said connecting means is a mid span joint.

* * * * *